United States Patent [19]
Kishi

[11] Patent Number: 5,969,846
[45] Date of Patent: Oct. 19, 1999

[54] CONFOCAL MICROSCOPE

[75] Inventor: Yosuke Kishi, Yokohama, Japan

[73] Assignee: Olympus Optical Co., Ltd., Tokyo, Japan

[21] Appl. No.: 08/977,740

[22] Filed: Nov. 25, 1997

[30] Foreign Application Priority Data

Nov. 28, 1996 [JP] Japan .................................. 8-317850

[51] Int. Cl.⁶ .................................................. G02B 26/02
[52] U.S. Cl. ...................................... 359/227; 359/235
[58] Field of Search ................................. 359/209, 210, 359/233, 234, 235, 368, 889, 891, 892

[56] References Cited

U.S. PATENT DOCUMENTS 5,717,519  2/1998  Sugiyama et al. ................. 359/368

FOREIGN PATENT DOCUMENTS

| 4-89906 | 8/1992 | Japan . |
| 5-332718 | 12/1993 | Japan . |
| 7-199074 | 8/1995 | Japan . |
| 8-110473 | 4/1996 | Japan . |

OTHER PUBLICATIONS

R. Juskaitis et al; "Efficient Real–Time Confocal Microscopy With White Light Sources"; Oct. 31, 1996; pp. 804–806; Nature vol. 383.

Primary Examiner—Cassandra Spyrou
Assistant Examiner—Jared Treas
Attorney, Agent, or Firm—Frishauf, Holtz, Goodman, Langer & Chick, P.C.

[57] ABSTRACT

A confocal microscope of the present invention comprises a pinhole disk having a plurality of pinholes, a wavelength selection section for switching a wavelength or wavelength range of at least one of illumination light and observation light in synchronism with rotation of the pinhole disk, and an irradiating section for rotating the pinhole disk and irradiating the irradiation light, which has passed through each of the pinholes, toward a specimen.

17 Claims, 10 Drawing Sheets

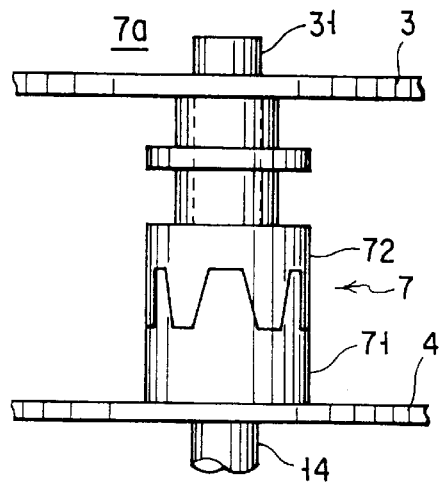
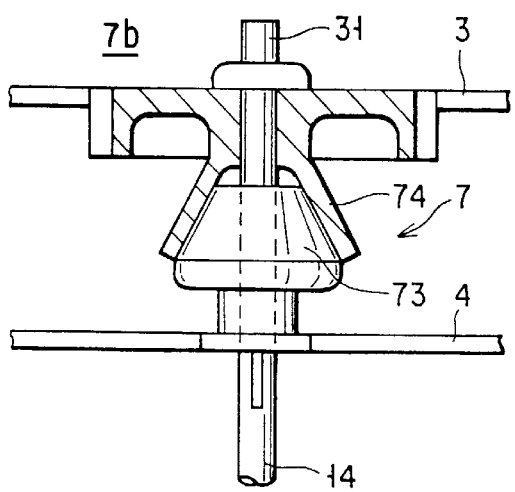
F I G. 4A    F I G. 4B
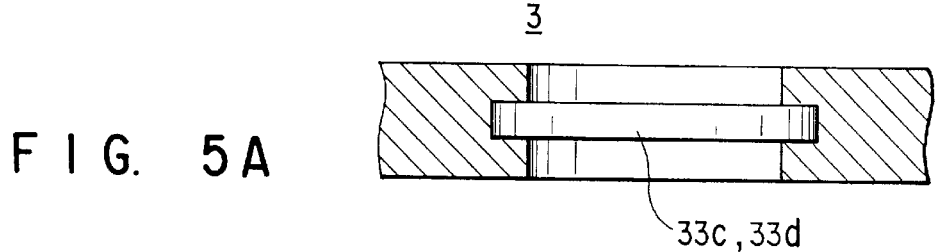
F I G. 5A
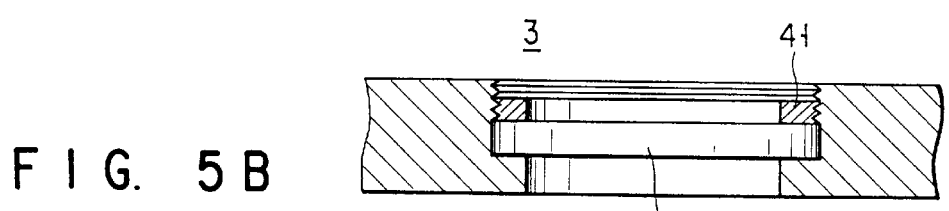
F I G. 5B
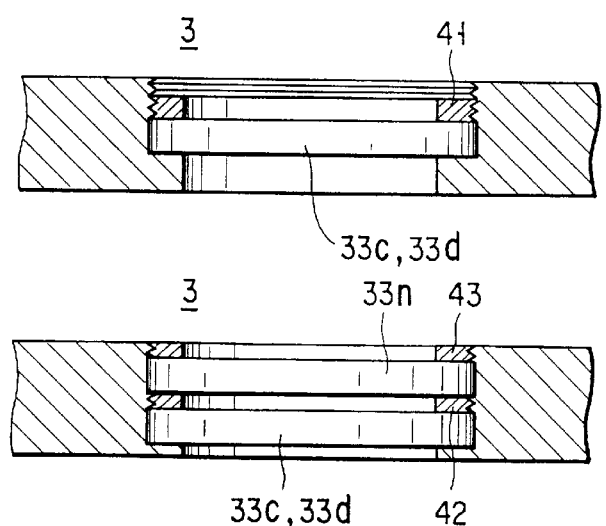
F I G. 5C
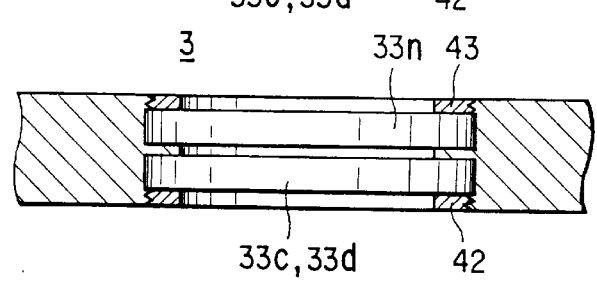
F I G. 5D

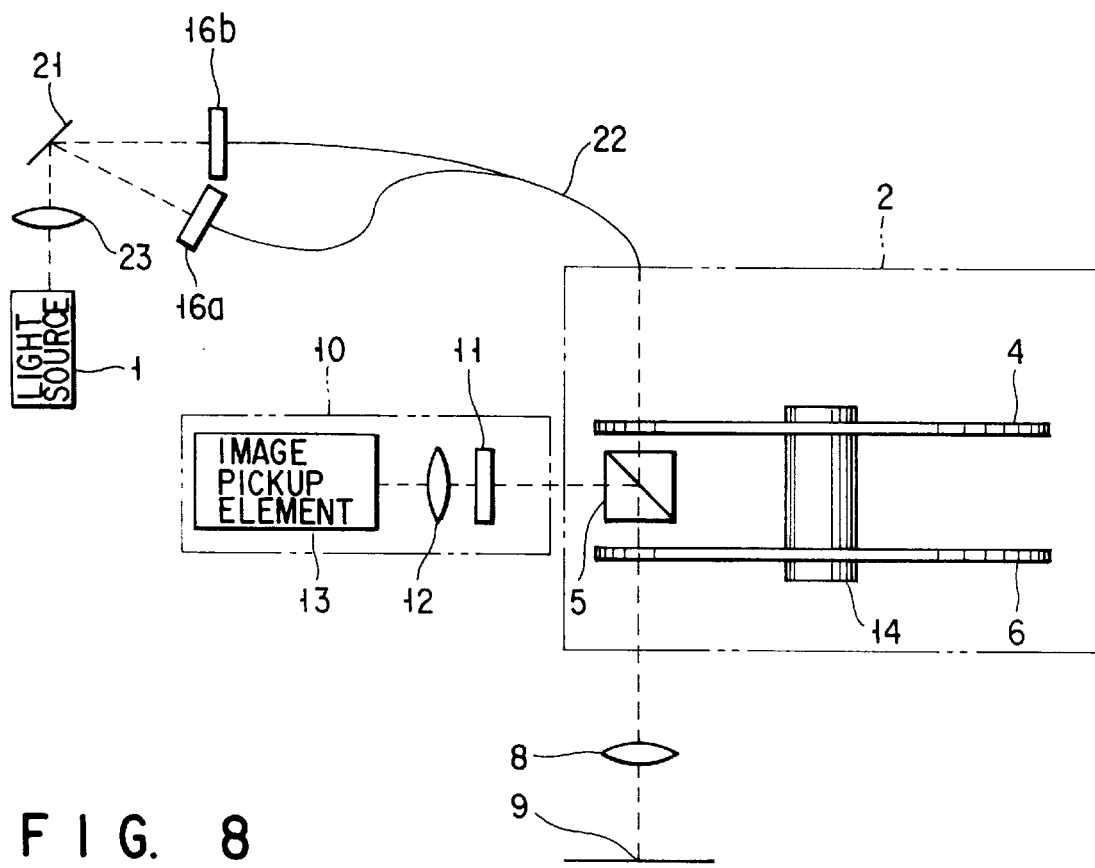
F I G. 8
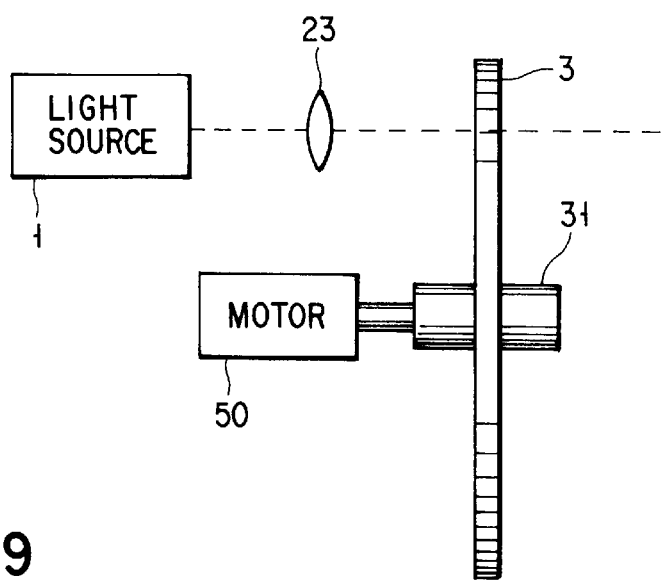
F I G. 9

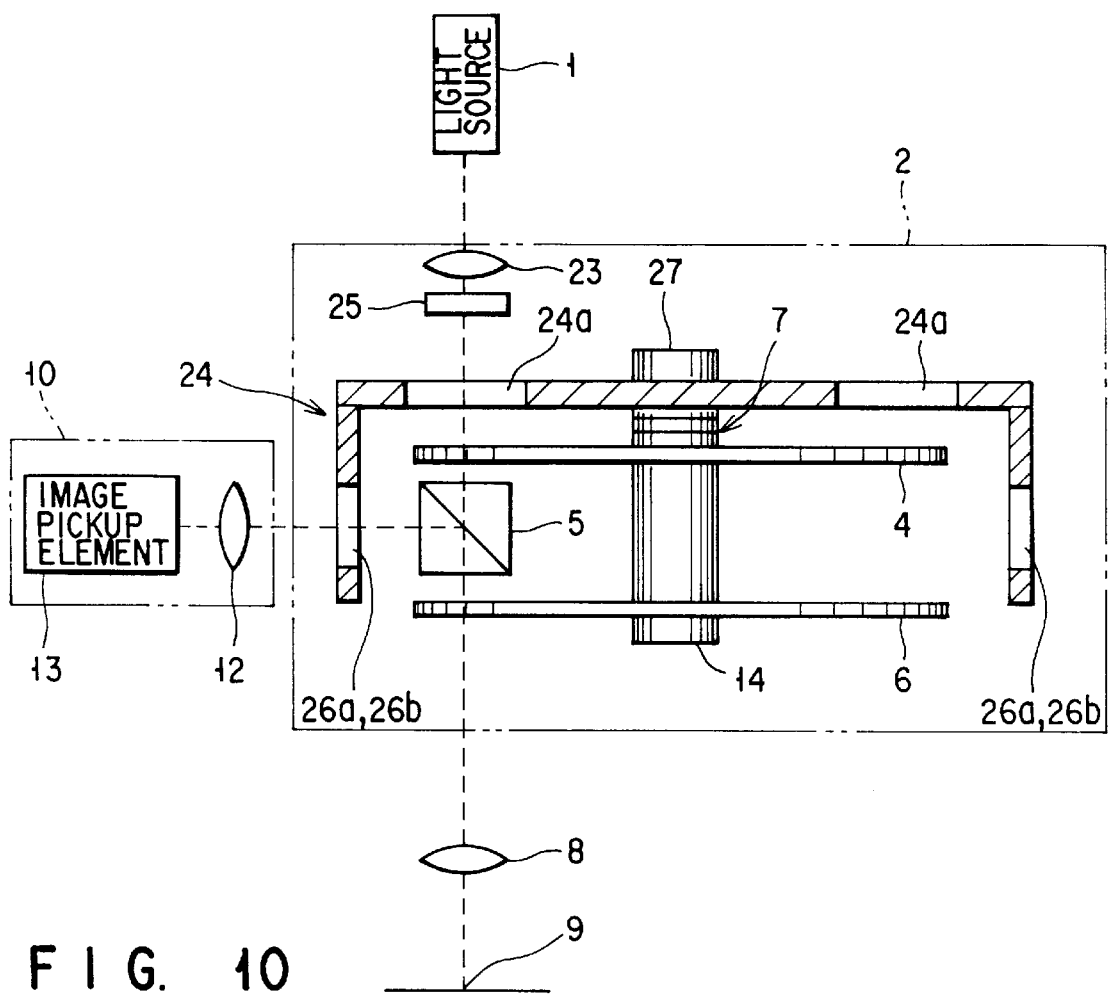
F I G. 10
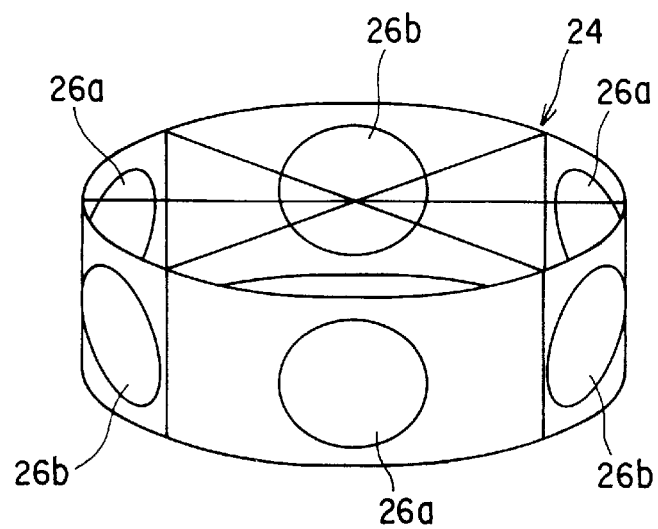
F I G. 11

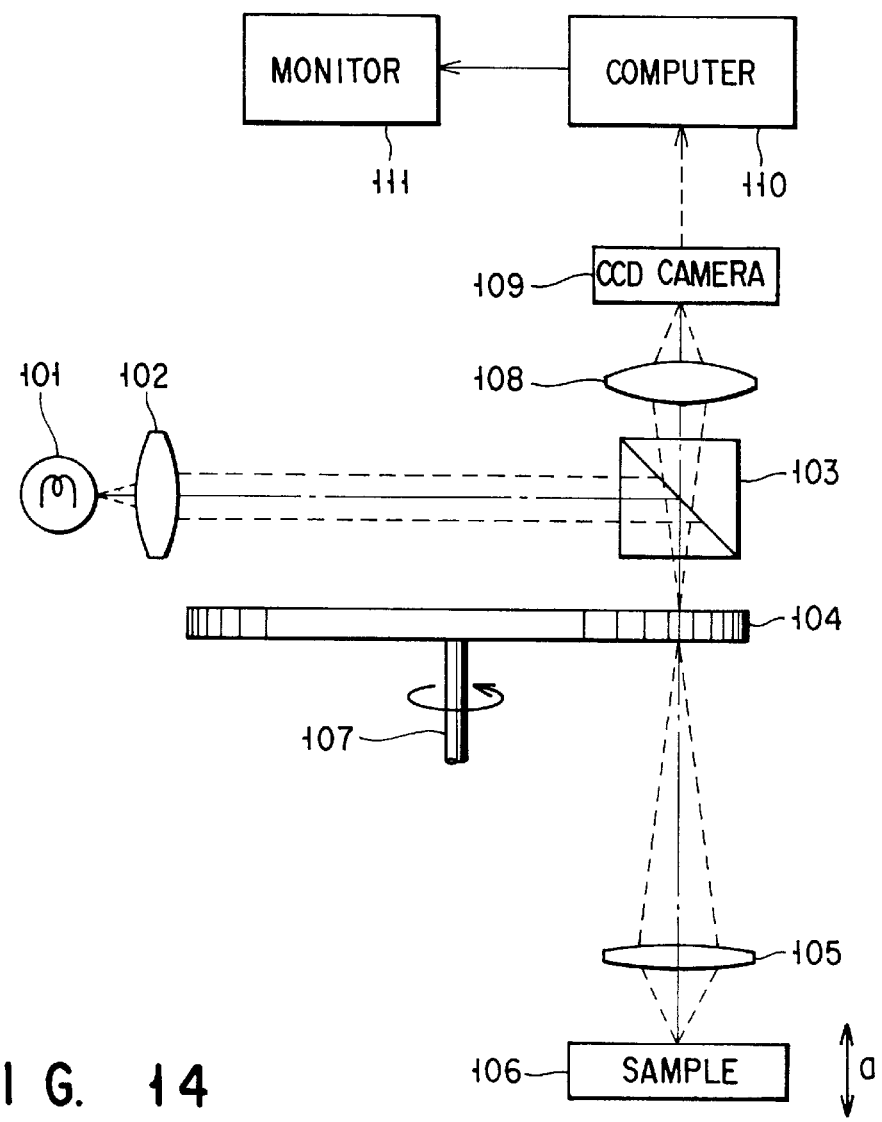
F I G. 14
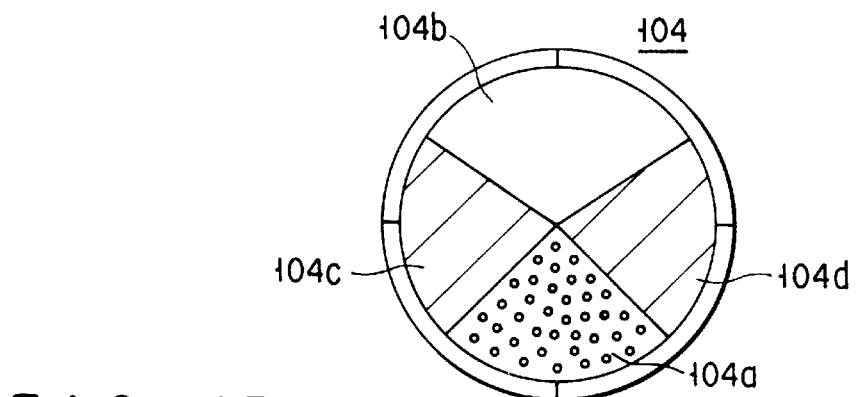
F I G. 15

CONFOCAL MICROSCOPE

BACKGROUND OF THE INVENTION

The present invention relates to a confocal microscope and, more particularly, to a confocal microscope which performs excitation and fluorescence observation of a specimen (sample).

As an example of a confocal microscope of this type, for example, a Nipkow disk type confocal microscope using a disk helically formed with a large number of pinholes at equal pitches is known. This Nipkow disk is fabricated such that the respective pinholes are separated from each other by a distance about ten times the pinhole diameter so as not to degrade the image from the sample. Otherwise, crosstalk (light leakage) from each pinhole causes noise in the adjacent pinhole to degrade the quality of the image, and the confocal effect cannot be achieved.

If, however, the space among the pinholes is increased in this manner, the density of the pinholes on the Nipkow disk decreases, and most of light that becomes incident on the disk is undesirably cut by the disk itself. The amount of light passing through the pinholes accordingly becomes, e.g., about one hundredth that of incident light, darkening the image.

In order to solve this drawback, e.g., Jpn. UM Appln. KOKAI Publication No. 4-89906 describes a technique in which microlenses are arranged to correspond to the respective pinholes of the pinhole plate. Although this technique improves the utilization efficiency of the light source, since a large number of lenses are arranged, the pinhole plate becomes expensive.

A technique which is an improvement over the Nipkow disk and pinhole plate described above is described in "Efficient real-time confocal microscopy with white light sources" by R. Juskaitis, T. Wilson, et al., Nature, Vol. 383, October 1996, pp. 804–806. According to this technique, a confocal image having a small degradation can be obtained with a confocal microscope which uses a rotary disk having opening portions and a random pinhole portion where a plurality of pinholes are formed at random.

R. Juskaitis et al. has found that, of two images obtained through the random pinhole portion or opening portions formed in this rotary disk, the image obtained through the random pinhole portion is the sum of a confocal component and a non-confocal component, and the image obtained through one opening portion is a non-confocal component.

FIG. 14 shows the arrangement of a conventional confocal microscope. An optical lens 102 and a half mirror 103 are arranged on the optical path of light emitted by a light source 101, and a sample 106 is arranged on the reflection optical path of the half mirror 103 through a rotary disk 104 and an objective lens 105.

FIG. 15 shows the arrangement of the rotary disk 104. A random pinhole portion 104a on which a plurality of pinholes are formed at random positions and an opening portion 104b through which light can pass freely are formed on the rotary disk 104 at positions to oppose each other. Light-shielding portions 104c and 104d are formed between the random pinhole portion 104a and the opening portion 104b. In the random pinhole portion 104a, the average space among the respective pinholes is substantially equal to the pinhole diameter.

As shown in FIG. 14, the rotary disk 104 is connected to the rotating shaft of a motor (not shown) through a rotating shaft 107, and is rotated at a constant rotation speed. A CCD camera 109 is arranged on the transmission optical path of the half mirror 103 through a condenser lens 108. A computer 110 comprising a CPU and the like is connected to the image output terminal of the CCD camera 109, and a confocal image obtained by arithmetic operation of the computer 110 is displayed on a monitor 111.

With this arrangement, light emitted by the light source 101 passes through the optical lens 102, is reflected by the half mirror 103, and becomes incident on the rotary disk 104 rotating at a constant rotation speed. Light that has passed through the random pinhole portion 104a or opening portion 104b of the rotary disk 104 is focused by the objective lens 105 to become incident on the sample 106. A light beam reflected by the sample 106 when irradiating the sample 106 with light passes through the random pinhole portion 104a or opening portion 104b again, is transmitted through the half mirror 103, and is focused on the image pickup surface of the CCD camera 109 by the condenser lens 108. The image pickup timing of the CCD camera 109 is controlled in synchronism with the rotation speed of the rotary disk 104, and the CCD camera 109 separately picks up two images that have passed through the random pinhole portion 104a and opening portion 104b.

More specifically, when light emitted by the light source 101 passes through the random pinhole portion 104a, and is focused by the objective lens 105 to become incident on the sample 106, the light beam reflected by the sample 106 at this time passes through the random pinhole portion 104a again, is transmitted through the half mirror 103, and is focused by the condenser lens 108 to form an image, including a confocal component and a non-confocal component, on the image pickup surface of the CCD camera 109. The image picked up by the CCD camera 109 and including the confocal and non-confocal components is fetched by the computer 110 as an image signal and is accumulated as image data.

When light emitted by the light source 101 passes through the opening portion 104b and is focused by the objective lens 105 to become incident on the sample 106, the light beam reflected by the sample 106 at this time passes through the opening portion 104b again, is transmitted through the half mirror 103, and is focused by the condenser lens 108 to form an image including the non-confocal component on the image pickup surface of the CCD camera 109. The image including the non-confocal image picked up by the CCD camera 109 is fetched by the computer 110 as an image signal and is accumulated as image data.

In this manner, of the two images obtained through the random pinhole portion 104a and opening portion 104b of the rotary disk 104, the image obtained through the random pinhole portion 104a is the sum of the confocal component and the non-confocal component, and the image obtained through the opening portion 104b is the non-confocal component. Hence, the computer 110 obtains a confocal image by calculating a difference between the image obtained through the random pinhole portion 104a and the image obtained through the opening portion 104b, and displays this confocal image on the monitor 111. The stereoscopic image near the surface of the sample 106 is obtained by moving the sample 106 in a vertical direction a shown in FIG. 14 by, e.g., a piezoelectric element or a movable table.

In the conventional Nipkow disk type confocal microscope, reflected light that can be utilized is 0.5% to 1% the incident light emitted by the light source. However, it is reported that, with the confocal microscope of T. Wilson et al., reflected light that can be utilized is 25% to 50% the incident light emitted by the light source, so that a brighter image can be obtained.

FIG. 16 shows the arrangement of a conventional Nipkow disk type scanning confocal microscope. This confocal microscope can perform excitation and fluorescence observation of the specimen, and is constituted by a light source 201, a scanner unit 202 having a lens 223, an excitation filter 203A, a microlens disk 204, a short-path dichroic mirror 205, and a pinhole disk 206, an objective lens 208, and an observation unit 210 having a photometric filter 211, a condenser lens 212, and an image pickup element 213.

Referring to FIG. 16, light emitted by the light source 201 is collimated into parallel light by the lens 223, and this parallel light passes through the excitation filter 203A and is transmitted through the microlenses of the microlens disk 204. The parallel light which has been transmitted through the microlenses is then transmitted through the dichroic mirror 205 and is focused on the pinhole surface formed on the pinhole disk 206. The light which has passed through the pinholes of the pinhole disk 206 is transmitted through the objective lens 208 and is focused again on the surface of a specimen 209. Thereafter, the fluorescence emitted by the surface of the specimen 209 is transmitted through the objective lens 208 and focused on the pinhole surface. The light which has been transmitted through the pinholes is reflected by the dichroic mirror 205, passes through the photometric filter 211 and condenser lens 212, is focused on the image pickup element 213 or an eyepiece (not shown), and is confirmed as a specimen image.

The excitation filter 203A for extracting excitation light is set between the light source 201 and microlens disk 204, and the photometric filter 211 is set before the image pickup element 213 or eyepiece (not shown). This enables 1-wavelength excitation and 1-wavelength fluorescence observation.

With the arrangement shown in FIG. 16, however, both the excitation filter 203A and photometric filter 211 for transmitting a specific wavelength are fixed. Although 1-wavelength excitation and 1-wavelength fluorescence observation and measurement can be performed, multiple excitation and multiple fluorescence observation and measurement (to be described hereinbelow) are sometimes difficult to perform depending on the type of the specimen. Multiple excitation is excitation of a specimen with a plurality of wavelengths when introducing excitation light. Multiple fluorescence observation is observation and measurement of fluorescence, emitted from a specimen, with a plurality of wavelengths.

FIG. 17 shows the arrangement of a scanning type confocal microscope in which a dichroic mirror 331 and observation units 330A and 330B are added to the arrangement of FIG. 16 in order to improve the drawbacks of the arrangement shown in FIG. 16. The observation unit 330A is constituted by a condenser lens 312A, a photometric filter 328A, and a TV (television) camera 329A. The observation unit 330B is constituted by a condenser lens 312B, a photometric filter 328B, and a TV (television) camera 329B.

In the arrangement shown in FIG. 17, since the observation units 330A and 330B are disposed on the optical path of the dichroic mirror 331, 2-wavelength fluorescence observation and measurement can be performed if the photometric filters 328A and 328B have different wavelengths. When a ratio image (a ratioing image) is to be calculated based on the respective images obtained by the TV cameras 329A and 329B, it is very difficult to perform adjustment such that the pixels of the images of the respective TV cameras 329A and 329B coincide with each other. Since the performances of the two TV cameras 329A and 329B vary, when the TV cameras 329A and 329B are to be replaced with new ones, adjustment must always be performed, which is cumbersome.

BRIEF SUMMARY OF THE INVENTION

It is an object of the present invention to provide a confocal microscope which can excite a specimen with a plurality of wavelengths when introducing excitation light and can observe and measure fluorescence emitted by the specimen with a plurality of wavelengths.

A confocal microscope of the present invention comprises a pinhole disk having a plurality of pinholes; a wavelength selection section for switching a wavelength or wavelength range of at least one of illumination light and observation light in synchronism with rotation of the pinhole disk; and an irradiating section for rotating the pinhole disk and irradiating the irradiation light, which has passed through each of the pinholes, toward a specimen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 4A is a view showing the arrangement of a clutch;

FIG. 4B is a view showing the arrangement of a clutch;

FIGS. 5A, 5B, 5C, and 5D are partially sectional views of the excitation filter disk;

FIG. 8 is a view showing the arrangement of a scanning type confocal microscope according to the third embodiment of the present invention;

FIG. 9 is a view showing a modification of the arrangement of FIG. 8;

FIG. 10 is a view showing the arrangement of a scanning type confocal microscope according to the fourth embodiment of the present invention;

FIG. 11 is a view showing the arrangement of a photometric filter drum;

FIG. 14 shows the arrangement of a conventional confocal microscope;

FIG. 15 shows the arrangement of a rotary disk;

DETAILED DESCRIPTION OF THE INVENTION

Figure 1:
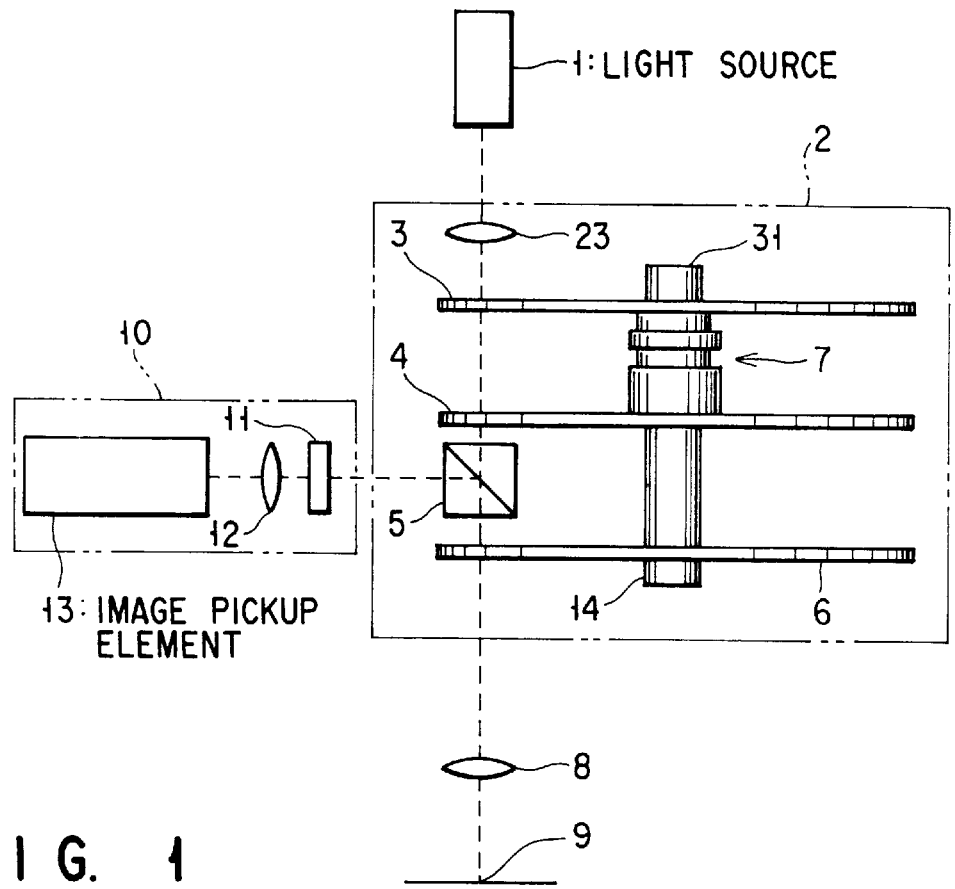
FIG. 1 is a view showing the arrangement of a scanning type confocal microscope according to the first embodiment of the present invention.

FIG. 1 is a view showing the arrangement of a scanning type confocal microscope according to the first embodiment of the present invention. The confocal microscope shown in FIG. 1 has a wavelength selection function which can select the wavelength or wavelength range of at least one of illumination light and observation light in synchronism with rotation of the pinhole disk.

This confocal microscope can perform excitation and fluorescence observation of a specimen, and is constituted by a light source 1, a scanner unit 2, an objective lens 8, a specimen (sample) 9, an observation unit 10, and a controller (not shown). The scanner unit 2 has a lens 23, an excitation filter disk 3, a microlens disk 4, a short-path dichroic mirror 5, a pinhole disk 6, a rotating shaft 31 of the excitation filter disk 3, a rotating shaft 14 of the microlens disk 4 and pinhole disk 6, a clutch 7, and a motor (not shown) for rotationally driving the rotating shaft 14.

The rotating shaft 31 is inserted in the central portion of the excitation filter disk 3. The rotating shaft 14 is inserted in the central portions of the disks 4 and 6 in order to rotate the microlens disk 4 and pinhole disk 6 simultaneously. The clutch 7 coaxially connects the rotating shaft 31 and rotating shaft 14, and disconnects them from each other by the control operation of the controller. The observation unit 10 has a photometric filter 11, a condenser lens 12, and an image pickup element (or an eyepiece) 13.

The lens 23, the excitation filter disk 3, the microlens disk 4, the dichroic mirror 5, the pinhole disk 6, the objective lens 8, and the specimen (sample) 9 are arranged on the optical path of the light source 1. The photometric filter 11, the condenser lens 12, and the image pickup element 13 are arranged on the optical path of the dichroic mirror 5 perpendicularly intersecting the optical path of the light source 1. The image pickup element 13 comprises an element that can acquire fluorescence, e.g., a TV camera, a CCD camera, an SIT tube, a CCD having an image intensifier (ICCD), a cooled CCD, or the like. The wavelength selection function is constituted by the excitation filter disk 3 and the clutch 7. This wavelength selection function will be described in detail below.

Figures 2A, 2B:
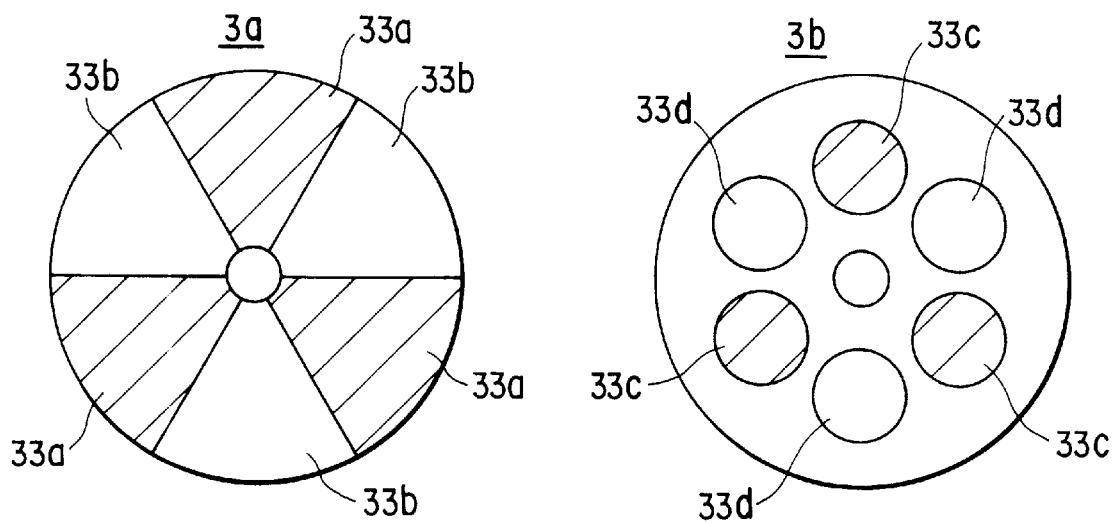
FIG. 2A is a view showing the arrangement of an excitation filter disk.
FIG. 2B is a view showing the arrangement of an excitation filter disk.

FIGS. 2A and 2B are views showing the arrangement of different type excitation filter disk 3a and excitation filter disk 3b, respectively. The excitation filter disk 3a shown in FIG. 2A has a circular shape and is formed by alternately disposing three sets of fan-like excitation filters 33a and 33b having different transmitting wavelengths. The number of sets of excitation filters 33a and 33b that can be disposed on the excitation filter disk 3 is not limited to 3, but one or more sets of excitation filters 33a and 33b can be disposed. As shown in FIG. 1, the excitation filter disk 3 has the rotating shaft 31 at its central portion, and is set such that part of its peripheral portion is located between the lens 23 and microlens disk 4. In place of the fan-like excitation filters 33a and 33b shown in FIG. 2A, one or more sets of circular excitation filters 33c and 33d having different wavelengths may be alternately disposed to form the excitation filter disk 3b, as shown in FIG. 2B.

Figure 3:
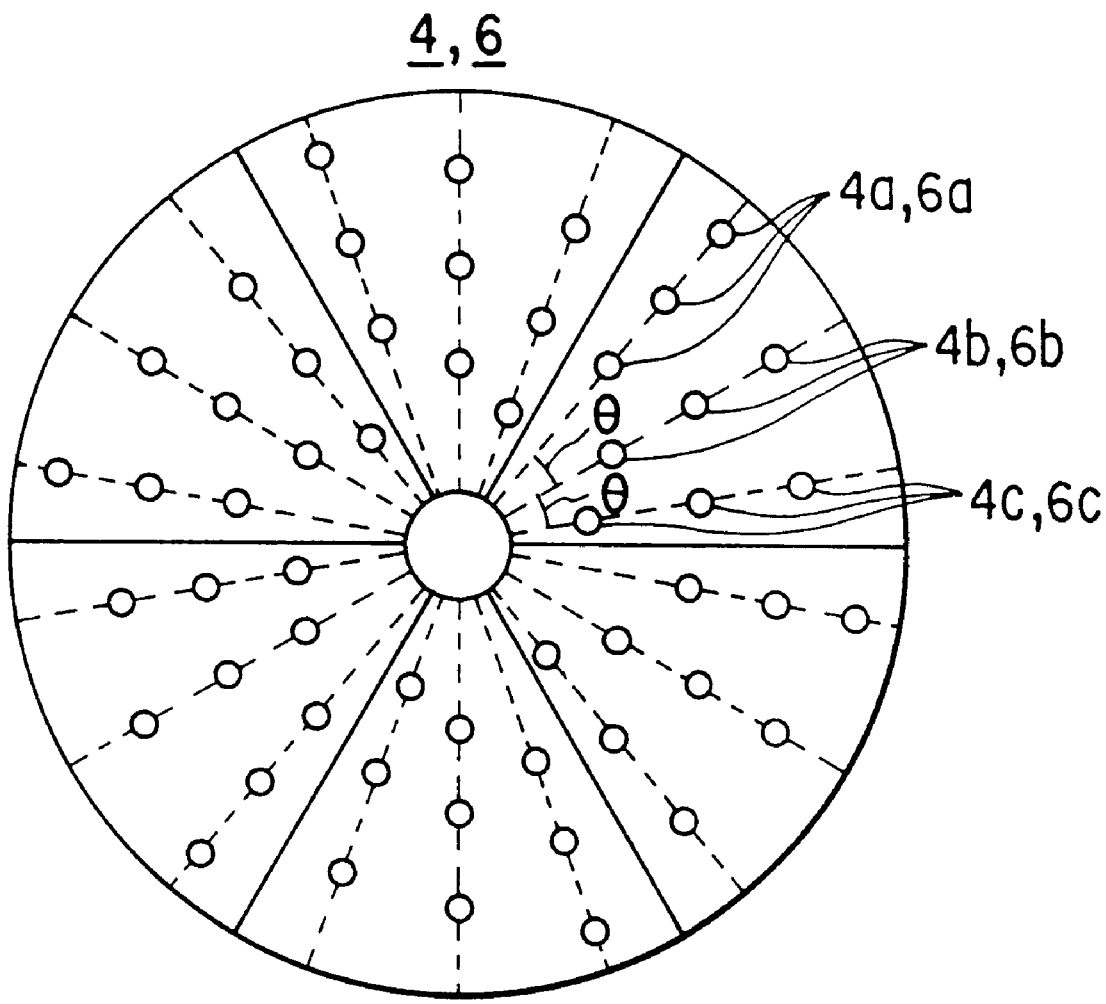
FIG. 3 shows the arrangement of a microlens disk and a pinhole disk.

FIG. 3 shows the arrangement of the microlens disk 4 and the pinhole disk 6. As shown in FIG. 3, a plurality of opening portions are formed with a constant space between them on the microlens disk 4 on straight lines extending in the radial direction from the center of the disk, and these opening portions form arrays. A plurality of such opening portion arrays are formed on the microlens disk 4 at a predetermined angle θ, and microlenses 4a, 4b, or 4c are disposed in the opening portions of each array.

The microlenses 4a, 4b, and 4c are arranged such that their positions are gradually shifted from adjacent arrays in the radial direction, and a plurality of arrays (three arrays in FIG. 3) shifted from each other constitute one set to acquire one frame image. Regarding the pinholes on the pinhole disk 6, a plurality of opening portions 6a, 6b, and 6c, i.e., pinholes, are formed in the same manner as on the microlens disk 4. In the example of FIG. 3, each of the disks 4 and 6 can acquire one frame image with one sixth its area, and six sets of the same pattern consisting of microlens arrays and six sets of the same pattern consisting of pinhole arrays are formed on the disks 4 and 6, respectively. Accordingly, when the disks 4 and 6 are rotated by one turn coaxially, six frame images are obtained.

FIGS. 4A and 4B are views showing the arrangement of different type clutch 7a and clutch 7b, respectively. In FIGS. 4A and 4B, portions that are identical to those in FIG. 1 are denoted by the same reference numerals as in FIG. 1. In the clutch 7a shown in FIG. 4A, a toothed meshing member 71 at the central portion is slidable in the axial direction. When the toothed meshing member 71 is meshed with a member 72 opposing to it as the other party, the driving force is connected. When the toothed meshing member 71 is pulled downward in the axial direction to disengage from the member 72, the driving force is disconnected. In the clutch 7b shown in FIG. 4B, a conical member 73 at the central portion is slidable in the axial direction. When the conical member 73 is brought into frictional contact with a member 74 opposing to it as the other party, the driving force is connected. When the conical member 73 is pulled downward in the axial direction to separate from the member 74, the driving force is disconnected.

The clutch 7 shown in FIG. 4A or 4B mechanically connect and disconnect the rotating shaft 31 of the excitation filter disk 3 and the rotating shaft 14 of the microlens disk 4 with and from each other. As the clutch 7, e.g., a solenoid clutch that can perform connection and disconnection with the electromagnetic force can be used.

In the above arrangement, the controller drives the motor to rotate the rotating shaft 14. Note that the rotating shaft 31 and rotating shaft 14 are connected to each other through the clutch 7 by the control operation of the controller. More specifically, since the rotating shaft 31 and rotating shaft 14 rotate coaxially and simultaneously in one direction, the excitation filter disk 3, microlens disk 4, and pinhole disk 6 rotate simultaneously in one direction. At this time, one array set of the microlens disk 4 (comprising the arrays of microlenses 4a, 4b, and 4c) shown in FIG. 3 is always located immediately below one excitation filter 33a or 33b (33c or 33d) of the excitation filter disk 3. Also, the pinholes 6a, 6b, and 6c of the pinhole disk 6 are located immediately below the microlenses 4a, 4b, and 4c, respectively, of the microlens disk 4.

Light (illumination light) emitted by the light source 1 is collimated into parallel light by the lens 23, and its wavelength is selected by the excitation filters 33a and 33b (33c and 33d) placed on the excitation filter disk 3. Light that has been transmitted through the excitation filters 33a and 33b (33c and 33d) is focused, by the plurality of microlenses 4a, 4b, and 4c placed on the microlens disk 4, on the respective pinholes 6a, 6b, and 6c on the pinhole disk 6 respectively corresponding to the microlenses 4a, 4b, and 4c. Since the dichroic mirror 5 has short-path characteristics (short wavelength is transmitted and long wavelength is reflected), excitation light (illumination light) that has been transmitted through the microlens disk 4 is transmitted through the dichroic mirror 5.

Light (illumination light) that has been transmitted through the plurality of pinholes on the pinhole disk 6 is focused on the same plane of the specimen 9 again by the objective lens 8. The specimen 9 is excited by the irradiated light to emit fluorescence. The fluorescence (observation light) is transmitted through the objective lens 8 again and is focused on the pinhole surface of the pinhole disk 6. The light (observation light) that has passed through the pinholes 6a, 6b, and 6c in the pinhole disk 6 is reflected by the dichroic mirror 5 and is guided to the observation unit 10. The light guided into the observation unit 10 is wavelength-limited by the photometric filter 11, and the resultant light is focused on the light-receiving surface of the image pickup element 13 by the condenser lens 12.

The excitation method will be described. As shown in FIG. 3, the microlenses on the microlens disk 4 and the plurality of pinholes on the pinhole disk 6 are arranged with a constant space between them in the radial direction of the disk. The microlenses and pinholes are arranged such that their positions are gradually shifted from adjacent arrays in the radial direction, and a plurality of arrays shifted from each other constitute one set to acquire one frame image. In the example shown in FIG. 3, six sets of the same pattern consisting of the arrays of microlenses 4a, 4b, and 4c, and six sets of the same pattern consisting of the arrays of pinholes 6a, 6b, and 6c are formed, so that each of the disks 4 and 6 can acquire one frame image with one sixth its area. Accordingly, when the microlens disk 4 and the pinhole disk 6 are rotated by one turn, six frame images can be obtained.

The excitation filter disk 3 is formed in accordance with the patterns of the microlens disk 4 and pinhole disk 6, and the fan-like excitation filters 33a and 33b are mounted on the disk 3, as shown in FIG. 2A. For example, in the case of 2-wavelength excitation, excitation filters 33a and 33b having different wavelengths are arranged alternately. When exciting fura-2 as a calcium ion fluorescence indicator, a 340-nm wavelength excitation filter and a 380-nm wavelength excitation filter are alternately set on the excitation filter disk 3.

When performing excitation with three wavelengths or more, it can be coped with by alternately setting 3 types or more excitation filters having required wavelengths, i.e., 3 or more types of excitation filters having different wavelengths. Thus, a time-series 2-wavelength excited image can be acquired by obtaining the image acquisition timing of the image pickup element 13 in synchronism with the switching operation of the excitation light done by rotation of the microlens disk 4, i.e., by rotation of the excitation filter disk 3.

In the case of 1-wavelength excitation, while the required excitation filter of the excitation filter disk 3 is located on the optical path of the light source 1, the excitation filter disk 3 is set still, and connection of the clutch 7 is canceled by the controller. Therefore, only the microlens disk 4 and pinhole disk 6 are rotated, and 1-wavelength excitation can be performed.

FIGS. 5A, 5B, 5C, and 5D are partially sectional views of the excitation filter disk 3 shown in FIG. 2B. As shown in FIG. 2B, when the excitation filters 33c and 33d mounted on the excitation filter disk 3 are formed circular, they not only can be fixed on an excitation filter disk 3 as shown in FIG. 5A but also can be made detachable. FIG. 5B shows a case in which an excitation filter 33c (33d) is inserted in a stepwise circular opening formed in a disk 3 and a ring-like stopper 41 having a threaded portion on its outer circumference is threadably inserted and fixed in this opening. In this manner, when the excitation filter mounted on the excitation filter disk 3 is formed circular and is made detachable, the excitation filter can be exchanged in accordance with the excitation wavelength. In this case, note that an excitation filter having a diameter larger than the beam spot diameter of the excitation light must be used.

In order to balance the light quantities of the excitation light beams of the two excitation filters 33c and 33d, appropriate ND filters are set on the respective filters. FIG. 5C shows a case in which an excitation filter 33c (33d) is inserted in a stepwise circular opening formed in a disk 3, a ring-like stopper 42 having a threaded portion on its outer circumference is threadably inserted and fixed in this opening, an ND filter 33n is inserted to locate on the stopper 42, and a stopper 43 is similarly threadably inserted and fixed in the opening. The vertical positional relationship between the excitation filter 33c (33d) and ND filter 33n can be reversed.

FIG. 5D shows a case wherein an excitation filter 33c (33d) is inserted in a stepwise circular opening formed in a disk 3 from the lower side of the disk 3, a ring-like stopper 42 having a threaded portion on its outer circumference is threadably inserted and fixed in the opening, an ND filter 33n is inserted from the upper side of the disk 3, and a stopper 43 is similarly threadably inserted and fixed in the opening. In this case as well, the vertical positional relationship between the excitation filter 33c (33d) and ND filter 33n can be reversed.

According to the first embodiment described above, when a rotary scanner unit having the microlens disk 4, the pinhole disk 6, and the excitation filter disk 3 is used, a confocal image can be acquired at a high speed with a simple arrangement. Even when images are alternately acquired in accordance with 2-wavelength photometry, sufficiently high-speed observation and measurement can be performed. Since the rotary scanner unit has the excitation filter disk 3 that can switch excitation light in synchronism with rotation of the pinhole disk 6, when excitation light is to be introduced, multiple excitation can be performed, that is, the specimen can be excited with a plurality of wavelengths.

Figure 6:
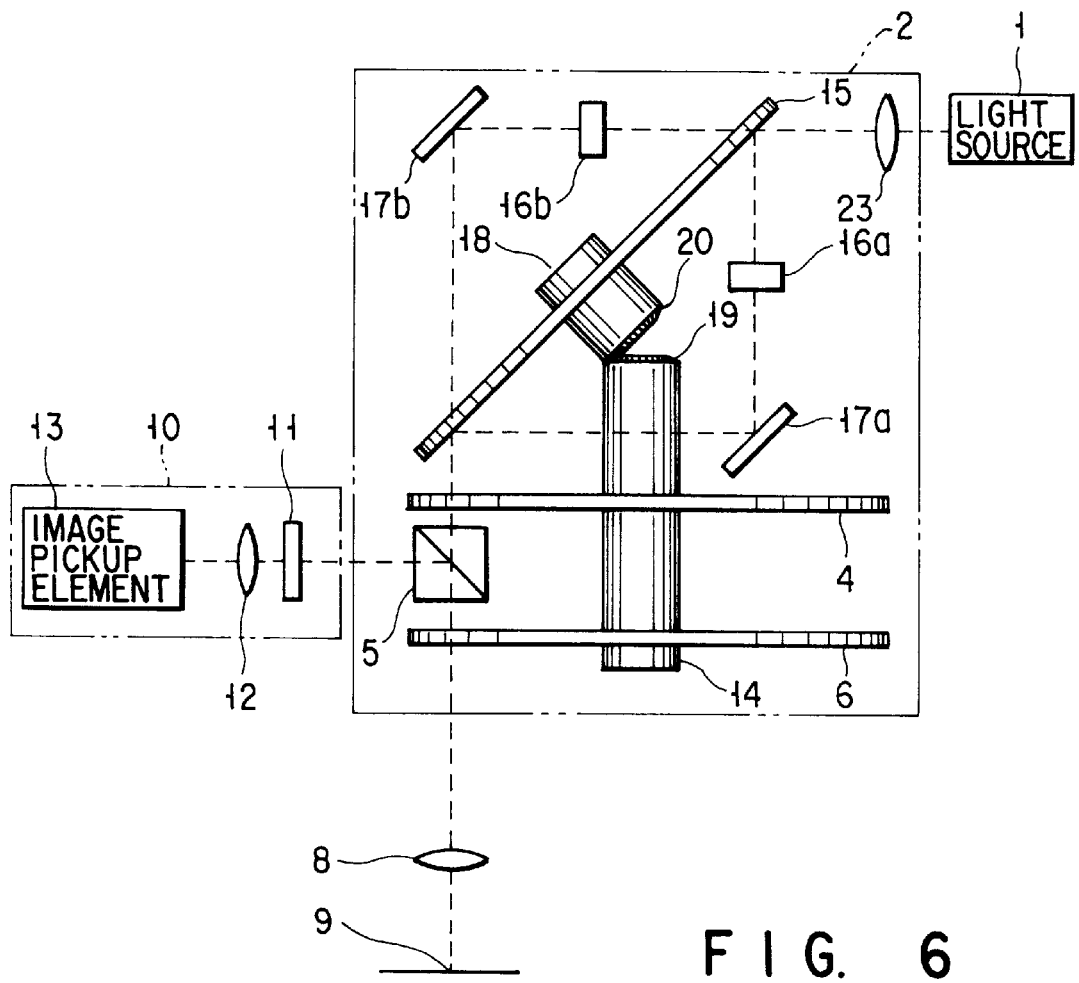
FIG. 6 is a view showing the arrangement of a scanning type confocal microscope according to the second embodiment of the present invention.

FIG. 6 is a view showing the arrangement of a scanning type confocal microscope according to the second embodiment of the present invention. In FIG. 6, portions that are identical to those in FIG. 1 are denoted by the same reference numerals as in FIG. 1. Unlike the one shown in FIG. 1, the wavelength selection function of this confocal microscope comprises a mirror disk 15, excitation filters 16a and 16b having different transmitting wavelengths, mirrors 17a and 17b, a rotating shaft 18, and gears 19 and 20. This confocal microscope can also perform excitation and fluorescence observation of a specimen.

Figure 7:
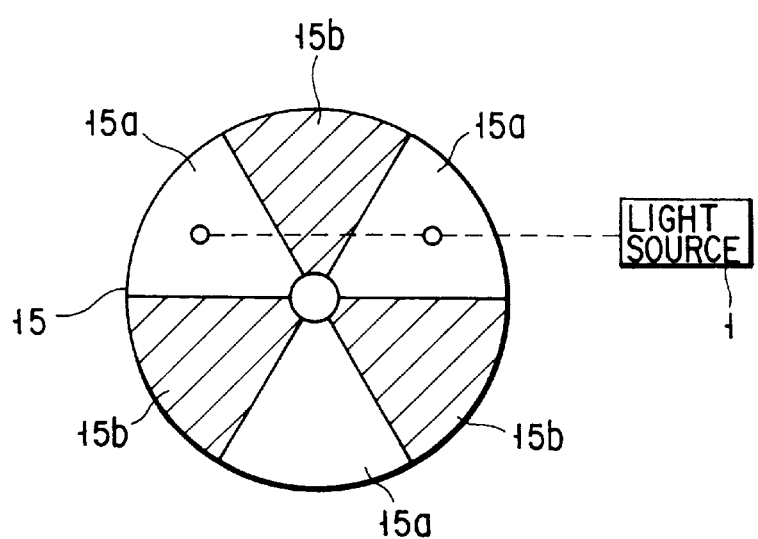
FIG. 7 is a view showing the arrangement of the mirror disk.

FIG. 7 is a view showing the arrangement of the mirror disk 15. The mirror disk 15 is obtained by alternately disposing fan-like light-transmitting portions 15a and fan-like reflecting portions 15b on a circular disk. As shown in FIG. 6, the rotating shaft 18 extends through and is fixed at the central portion of the disk 15. The gear 20 is arranged on one end portion of the rotating shaft 18. The gear 19 is arranged on one end portion of a rotating shaft 14 of a microlens disk 4. The gears 20 and 19 are inclined with respect to each other by substantially 45° so that they mesh with each other. Accordingly, as the rotating shaft 14 rotates, the rotating shaft 18 rotates through the gears 19 and 20. The gear ratio of the gear 19 to the gear 20 is 1:1.

Referring to FIG. 6, parallel light which has been collimated by a lens 23 is reflected at a right angle by the reflecting portions 15b of the mirror disk 15. This reflected light is transmitted through the excitation filter 16a, is reflected at a right angle by the mirror 17a, and is reflected again at a right angle by the reflecting portions 15b of the mirror disk 15 to be guided to the microlenses on the microlens disk 4. Parallel light which has been collimated by the lens 23 is also transmitted through the light-transmitting portions 15a of the mirror disk 15. This transmitted light is transmitted through the excitation filter 16b, is reflected at a right angle by the mirror 17b, and is transmitted through the light-transmitting portions 15a of the mirror disk 15 again to be guided to the microlenses on the microlens disk 4.

The operation of the confocal microscope having the above arrangement will be described. When the controller drives the motor to rotate the rotating shaft 14, the mirror disk 15 is rotated through the rotating shaft 18. Light emitted by a light source 1 is collimated into parallel light by the lens 23, and is transmitted through the light-transmitting portions 15a of the mirror disk 15 set in a scanner unit 2. Light which has been transmitted through the light-transmitting portions 15a is wavelength-selected by the excitation filter 16b. Light having the selected wavelength is reflected by the mirror 17b and is transmitted through the light-transmitting portions 15a of the mirror disk 15 again to be guided to the microlenses on the microlens disk 4.

When the mirror disk 15 rotates through a predetermined angle, light emitted by the light source 1 is reflected by the reflecting portions 15b of the mirror disk 15, and its wavelength is selected by the excitation filter 16a. Light having the selected wavelength is reflected by the mirror 17a and is reflected by the reflecting portions 15b of the mirror disk 15 again to be guided to the microlenses on the microlens disk 4. The operation after this is identical to that shown in the first embodiment, and a description thereof will therefore be omitted.

As described above, the mirror disk 15 is linked with the rotating shaft 14 of the microlens disk 4 through the gear 20, and the gear ratio of the gear 20 to the gear 19 is 1:1. For this reason, a time-series 2-wavelength excited image can be acquired by obtaining the image acquisition timing of the image pickup element 13 in synchronism with the switching operation of the excitation light done by rotation of the microlens disk 4, i.e., by the mirror unit. In the second embodiment, since the excitation filter is fixed, unlike in the first embodiment, more stable excitation can be performed. Other functions and effects are the same as those in the first embodiment.

In FIG. 6, the optical path extending from the mirror 17a to the mirror disk 15 is shifted from the mirror disk 15 and rotating shaft 14 by an amount corresponding to a predetermined offset amount, so light reflected by the mirror 17a will not interfere with the rotating shaft 14. This offset amount is set such that excitation light, upon incidence on the mirror disk 15 to be transmitted through it, is reflected by the mirror 17b and is reliably transmitted through the mirror disk 15 again, and that excitation light, upon reflected by the mirror disk 15, is reflected by the mirror 17a and is reliably reflected by the mirror disk 15 again.

FIG. 8 is a view showing the arrangement of a scanning type confocal microscope according to the third embodiment of the present invention. In FIG. 8, portions that are identical to those in FIG. 1 are denoted by the same reference numerals as in FIG. 1. Unlike the one shown in FIG. 1, the wavelength selection function of this confocal microscope comprises a galvanomirror 21, excitation filters 16a and 16b, and an optical fiber 22. This confocal microscope can also perform excitation and fluorescence observation of a specimen.

Light emitted by a light source 1 is collimated into parallel light by a lens 23. The parallel light is split by the galvanomirror 21 in a time-series manner. One split light beam is transmitted through the excitation filter 16a while the other split light beam is transmitted through the excitation filter 16b. The wavelengths of both split light beams are selected by the excitation filters 16a and 16b, respectively, and the wavelength-selected light beams are guided to the optical fiber 22. Light emerging from the optical fiber 22 is guided to microlenses on a microlens disk 4. The operation after this is the same as that shown in the first embodiment, and its description will be omitted.

In this confocal microscope, the frequency of the galvanomirror 21 and the rotation speed of the microlens disk 4 are electrically linked with each other by the controller. More specifically, in the case of the microlens disk 4 divided into six portions as shown in FIG. 3, while the microlens disk 4 rotates by one turn, the galvanomirror 21 oscillates at three periods. A time-series 2-wavelength excited image can be acquired by obtaining the image acquisition timing of an image pickup element 13 in synchronism with the frequency of the galvanomirror 21. When performing 1-wavelength excitation, the galvanomirror 21 is set still to oppose either the excitation filter 16a or 16b.

When an image need not be acquired at a high speed, if image acquisition switching is performed in synchronism with the switching operation of the galvanomirror 21, i.e., in synchronism with the switching operation of the excitation light, the microlens disk 4 need not be synchronized. A slider can be used in place of the galvanomirror 21. Other functions and effects are the same as those in the first embodiment.

FIG. 9 is a view showing a modification of the arrangement of FIG. 8. In FIG. 9, in place of the galvanomirror 21, the excitation filters 16a and 16b, and the optical fiber 22 shown in FIG. 8, the rotating shaft of a motor 50 is connected to a rotating shaft 31 of an excitation filter disk 3 identical to that described above. When the motor 50 and a motor which drives a rotating shaft 14 identical to that described above are synchronously controlled by a controller identical to that described above, rotation of the excitation filter disk 3, microlens disk 4, and pinhole disk 6 can be synchronized. Other arrangements in FIG. 9 are the same as those shown in FIG. 8. Even with this arrangement, the function and effect that are the same as those in the third embodiment can be achieved.

FIG. 10 is a view showing the arrangement of a scanning type confocal microscope according to the fourth embodiment of the present invention. In FIG. 10, portions that are identical to those shown in FIG. 1 are denoted by the same reference numerals as in FIG. 1. Unlike the one shown in FIG. 1, the wavelength selection function of this confocal microscope comprises a photometric filter drum 24 and a clutch 7. The confocal microscope shown in FIG. 10 is different from that shown in FIG. 1 in that, while the wavelength selection function of FIG. 1 comprises the excitation filter disk 3 and clutch 7, that of FIG. 10 comprises the photometric filter drum 24 and clutch 7. This confocal microscope can perform multiple wavelength observation and measurement of fluorescence emitted by a specimen.

FIG. 11 is a view showing the arrangement of the photometric filter drum 24. In FIG. 11, the bottom portion of the photometric filter drum 24 is omitted for the sake of illustrative convenience. The photometric filter drum 24 is a bottomed cylinder, and a rotating shaft 27 shown in FIG. 10 extends through and is fixed to its bottom surface. A plurality of opening portions 24a are formed in the bottom surface of the photometric filter drum 24, and photometric filters 26a and 26b having different wavelengths are alternately arranged on the circumferential surface of the photometric filter drum 24. Rotation of the rotating shaft 27 and that of a rotating shaft 14 can be synchronized to each other by interposing the clutch 7 described above between the rotating shaft 27 and the rotating shaft 14 of a microlens disk 4 and a pinhole disk 6.

Referring to FIG. 10, light emitted by a light source 1 is collimated into parallel light by a lens 23. The wavelength of the parallel light is selected by an excitation filter 25, and the wavelength-selected light is guided to a plurality of microlenses set on the microlens disk 4. After this, the operation until fluorescence emitted by a specimen 9 is reflected by a dichroic mirror 5 is the same as that shown in the first embodiment, and its description will be omitted.

The fluorescence reflected by the dichroic mirror 5 is transmitted through the photometric filter 26a or 26b set on the photometric filter drum 24 to be wavelength-limited, and is guided to an observation unit 10. The fluorescence which has been guided to the observation unit 10 is focused on the light-receiving surface of an image pickup element 13 by a condenser lens 12 arranged in the observation unit 10.

Multiple wavelength photometry method will be described. As described in the first embodiment, six sets of the same pattern consisting of microlens arrays and six sets of the same pattern consisting of pinhole arrays are formed, so that the disk 4 can acquire one frame image with one sixth its area. The photometric filter drum 24 is set to have the arrangement as shown in FIG. 11, and the rotating shaft 27 is connected to the rotating shaft 14 of the microlens disk 4 through the clutch 7. A time-series 2-wavelength excited image can be acquired by obtaining the image acquisition timing of the image pickup element 13 in synchronism with the switching operation of the photometric filter 26a or 26b done by rotation of the microlens disk 4, i.e., by rotation of the photometric filter drum 24.

For example, when performing photometry by using an indo-1, which is a calcium ion fluorescence indicator, a 350-nm wavelength filter is set as the excitation filter 25, and 405- and 480-nm photometric filters are alternately set on the photometric filter 26a or 26b. When balancing the light quantities of the excitation light beams of these two wavelengths, ND filters may be set on the photometric filter 26a or 26b, as described above.

As described above, the rotating shaft 27 of the photometric filter drum 24 can be connected to and disconnected from the rotating shaft 14 of the microlens disk 4 and pinhole disk 6. When performing photometry with either one wavelength of the two photometric filters, the clutch 7 is disconnected by the controller, so that the photometric filter drum 24 can be rotated manually. At this time, when the photometric filter drum 24 is set still while the required photometric filter on the photometric filter drum 24 is located on the optical path extending to the image pickup element 13, a 1-wavelength photometric image can be acquired.

Figure 17:
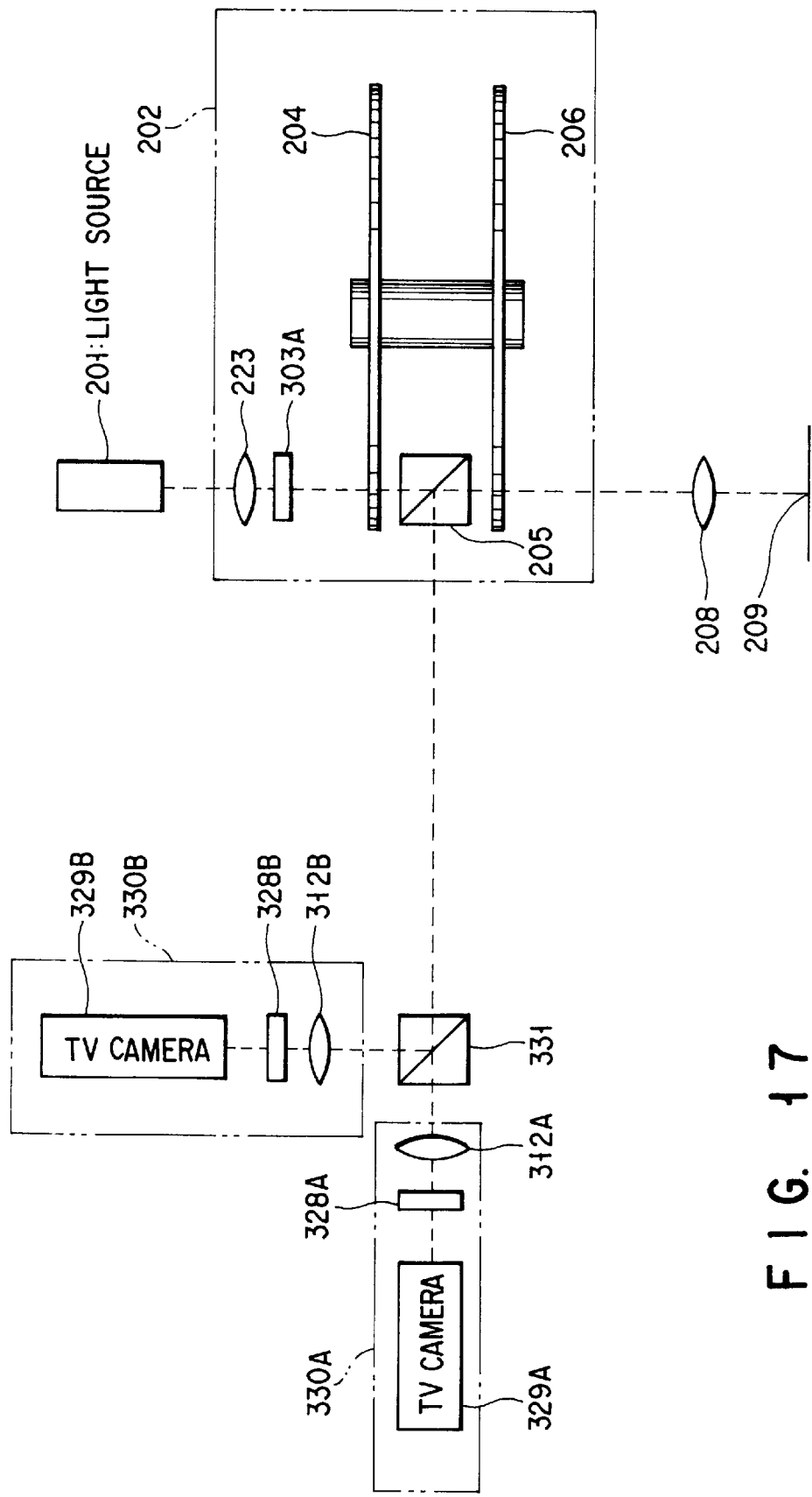
FIG. 17 shows the arrangement of a scanning type confocal microscope.

In contrast to this, when performing 2-wavelength photometry in accordance with the conventional method described above, two image pickup elements, e.g., TV cameras 329A and 329B, are sometimes set, as shown in FIG. 17. With this arrangement, when a ratio image (ratioing image) is to be calculated based on the respective images, it is very difficult to perform adjustment such that the pixels of the respective images of the TV cameras coincide with each other. However, according to the fourth embodiment, since the photometric filter drum 24 which can switch the fluorescence wavelength in synchronism with rotation of the pinhole disk 6 is provided, multiple fluorescence observation can be performed, that is, the fluorescence emitted by the specimen 9 can be observed and measured with a plurality of wavelengths, and the ratio image can be calculated easily.

In the embodiments described above, the excitation filter disk 3 is arranged between the microlens disk 4 and the lens 23. Even when the excitation filter disk 3 is arranged between the microlens disk 4 and the dichroic mirror 5, and the excitation filter disk 3, the microlens disk 4, and the pinhole disk 6 are synchronously rotated, the present invention can be practiced in the same manner as in the above embodiments. In this case, in FIG. 1, the positions of the excitation filter disk 3 and microlens disk 4 are switched.

In the embodiments described above, the pinhole disk 6 and the microlens disk 4 that have the same pattern are rotated by one rotating shaft 14. This aims at improving the utilization efficiency of light. However, depending on applications, the utilization efficiency of light need not be improved.

Figure 12:
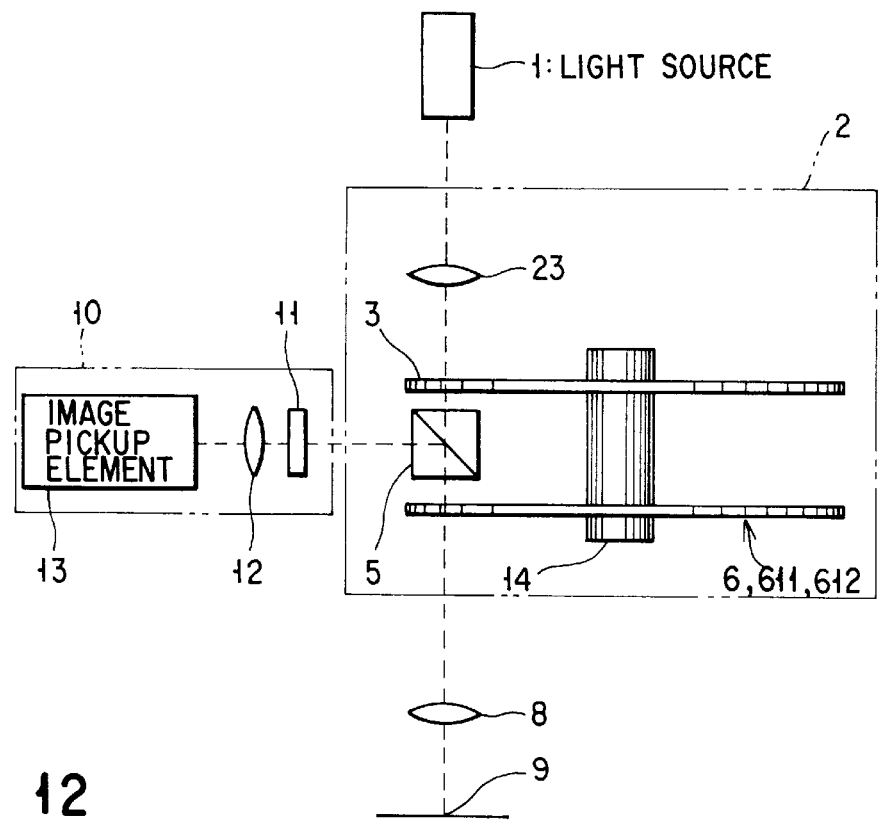
FIG. 12 shows a modification of the above embodiments.

FIG. 12 shows a modification of the above embodiments. In FIG. 12, portions that are identical to those in FIG. 1 are denoted by the same reference numerals as in FIG. 1. In FIG. 12, the microlens disk 4 is omitted, and a pinhole disk 6 (611, 612) and an excitation filter disk 3 are mounted on one rotating shaft 14. If the utilization efficiency of light source need not be improved, the microlens disk 4 for focusing light emitted by the light source on pinholes can be omitted. Specifically, when a random pinhole disk shown in FIGS. 13A or 13B is used, a bright image can be obtained without use of the microlens disk 4 because the utilization efficiency of light source is remarkably improved.

Figure 13A:
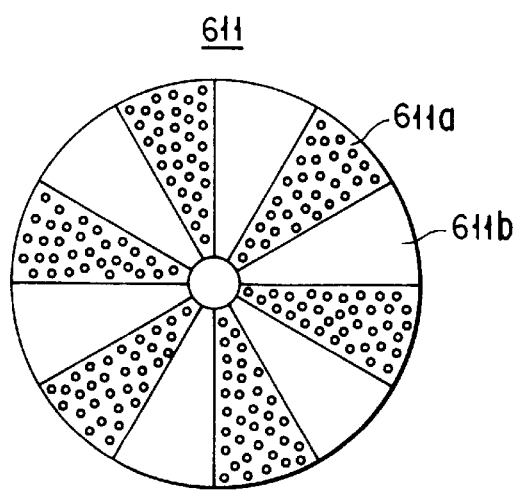
FIG. 13A is a view showing the arrangement of a random pinhole disk applied to a scanning type confocal microscope according to the fifth embodiment of the present invention.
Figure 13B:
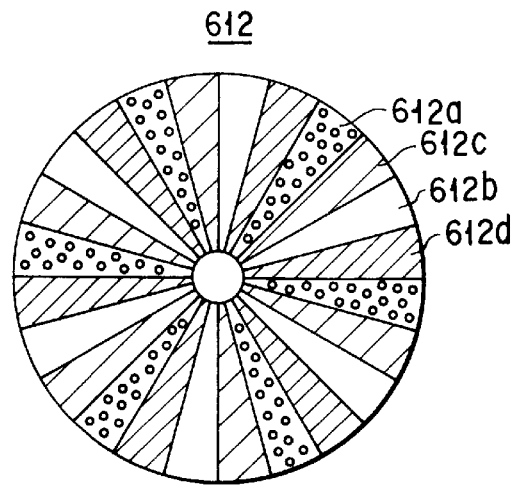
FIG. 13B is a view showing the arrangement of a random pinhole disk applied to a scanning type confocal microscope according to the fifth embodiment of the present invention.
Figure 16:
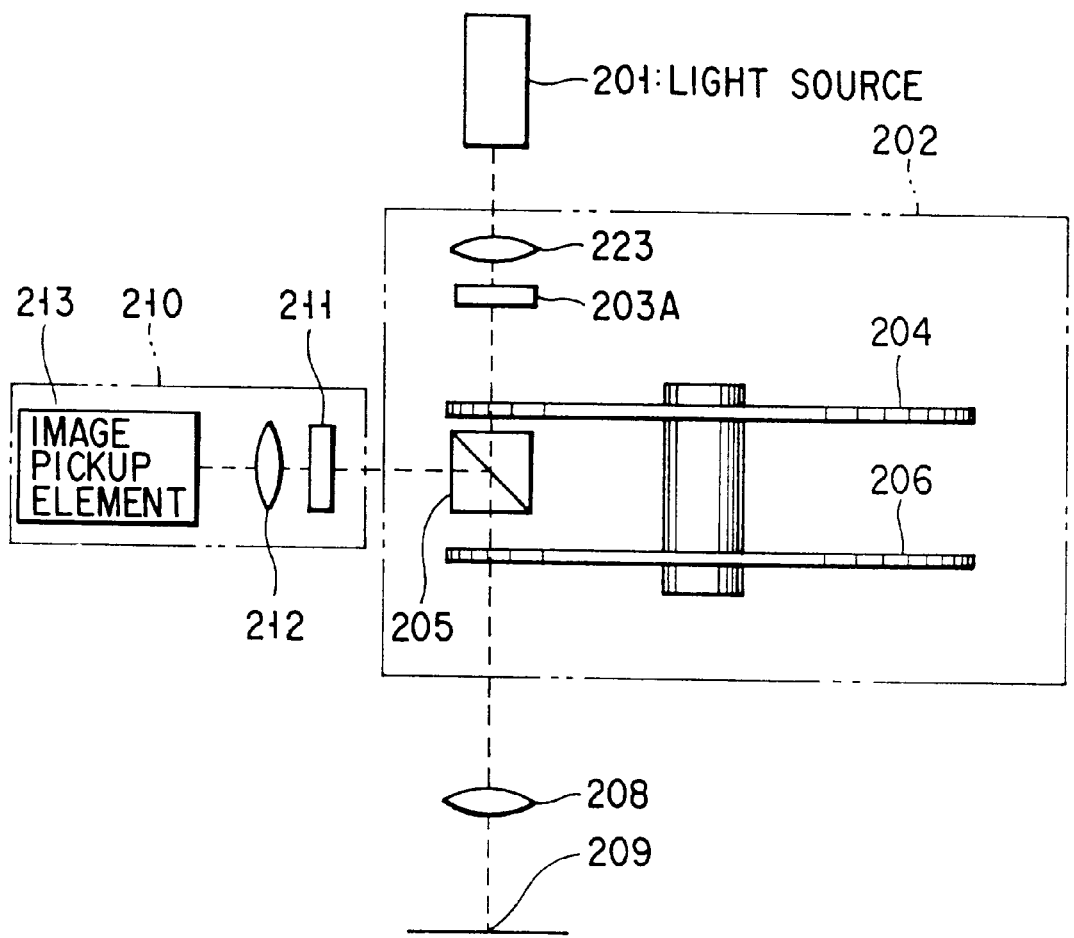
FIG. 16 shows the arrangement of a conventional Nipkow disk type scanning confocal microscope.

FIGS. 13A and 13B are views showing the arrangement of different type random pinhole disk 611 and random pinhole disk 612 applied to a scanning type confocal microscope according to the fifth embodiment of the present invention. A random pinhole disk 611 or 612 shown in each of FIGS. 13A and 13B is mounted in a confocal microscope identical to that shown in FIG. 12 in place of the pinhole disk 6.

The random pinhole disk 611 shown in FIG. 13A is equally divided into 12 fan-like portions, and has a circular shape on which fan-like random pinhole portions 611a and fan-like opening portions 611b are alternately disposed. Each random pinhole portion 611a is formed with a plurality of pinholes at random, and the average space among the respective pinholes is substantially equal to the pinhole diameter. A pair of random pinhole portion 611a and opening portion 611b of the random pinhole disk 61 are always located immediately under one excitation filter 33a or 33b (33c or 33d) of an excitation filter disk 3.

With this arrangement, as described above, the image obtained through the random pinhole portion 611a is the sum of a confocal component and a non-confocal component, and the image obtained through the opening portion 611b is a non-confocal component. More specifically, when the image pickup timing of an image pickup element 13 is controlled by a controller identical to that described above in synchronism with the rotation speed of the excitation filter disk 3 and random pinhole disk 611 that rotate simultaneously, the two images that have passed through the random pinhole portion 611a and opening portion 611b can be picked up separately. And, a confocal component can be obtained by calculating a difference between the images.

FIG. 13B shows a modification of the random pinhole disk shown in FIG. 13A. The random pinhole disk 612 shown in FIG. 13B is equally divided into 24 fan-like portions, and has a circular shape on which fan-like random pinhole portions 612a, fan-like light-shielding portions 612c, fan-like opening portions 612b, and fan-like light-shielding portions 612d are alternately formed in this order. A set of random pinhole portion 612a, light-shielding portion 612c, opening portion 612b, and light-shielding portion 612d of the random pinhole disk 612 are always located immediately under one excitation filter 33a or 33b (33c or 33d) of an excitation filter disk 3.

With this arrangement, since the light-shielding portions 612c and 612d are present between the random pinhole portion 612a and opening portion 612b, an image is obtained through the random pinhole portion 612a. Then, with a lapse of predetermined time after this, another image is obtained through the opening portion 612b. Then, with a lapse of predetermined time after this, still another image is obtained through the random pinhole portion 612a. More specifically, the two images that have passed through the random pinhole portion 612a and opening portion 612b can be picked up reliably separately, and unnecessary noise and the like can be removed by the light-shielding portions 612c and 612d.

As has been described above, since the confocal microscope of the present invention has a wavelength selection function that can switch excitation light in synchronism with rotation of the pinhole disk, when excitation light is to be introduced, multiple excitation can be performed, that is, the specimen can be excited with a plurality of wavelengths. Since the wavelength selection function that can switch the fluorescence wavelength in synchronism with rotation of the pinhole disk is provided, multiple fluorescence observation can be performed, that is, the fluorescence emitted by the specimen can be observed and measured with a plurality of wavelengths. More specifically, when introducing excitation light, the specimen can be excited with a plurality of wavelengths, and fluorescence emitted by the specimen can be observed and measured with a plurality of wavelengths.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:
1. A confocal microscope comprising:
a pinhole disk having a plurality of pinholes;
wavelength selection means for switching a wavelength or wavelength range of at least one of illumination light and observation light in synchronism with rotation of said pinhole disk;
means for rotating said pinhole disks and means for irradiating the illumination light, which has passed through each of said pinholes, toward a specimen.
2. A microscope comprising:
a pinhole disk having a plurality of pinholes;
a microlens disk having a plurality of opening portions, each of said plurality of opening portions being provided with a microlens;
wavelength selection means for switching a wavelength or wavelength range of at least one of illumination light and observation light in synchronism with rotation of said pinhole disk;
means for rotating said pinhole disk and said microlens disk in a phase-locked manner; and
means for irradiating the illumination light, which has been focused on each of said pinholes by said microlens and passed through each of said pinholes, toward a specimen.
3. A microscope according to claim 2, wherein said wavelength selection means is arranged on either one of an incident side and an exit side of said microlens disk.
4. A microscope according to claim 3, wherein said wavelength selection means comprises an excitation filter disk having a plurality of types of excitation filters.
5. A microscope according to claim 4, further comprising connecting means for connecting said excitation filter disk and said pinhole disk so as to synchronously rotate.
6. A microscope according to claim 5, wherein said connecting means comprises a mechanical connecting mechanism.
7. A microscope according to claim 5, wherein said connecting means comprises an electromagnetic connecting mechanism.
8. A microscope according to claim 4, wherein said excitation filter disk comprises exchange means for exchanging said excitation filter.
9. A microscope according to claim 4, wherein said excitation filter disk comprises adjusting means for adjusting a quantity of light to be guided to said excitation filter.
10. A microscope according to claim 9, wherein said adjusting means comprises a mechanism in which a predetermined ND filter can be set on said excitation filter.
11. A microscope according to claim 1, wherein said wavelength selection means comprises:
a plurality of types of fixed excitation filters; and
transmitting means for selectively transmitting the irradiated illumination light to said excitation filters.
12. A microscope according to claim 1, wherein said wavelength selection means comprises a drum having a plurality of types of excitation filters and a plurality of types of photometric filters.
13. A microscope according to claim 1, wherein said wavelength selection means comprises:
a plurality of types of excitation filters; and
reflecting means for selectively reflecting the irradiated illumination light toward said excitation filters.
14. A microscope according to claim 4, further comprising:

first driving means for rotationally driving said pinhole disk;

second driving means for rotationally driving said excitation filter disk; and control means for synchronizing rotation of said pinhole disk driven by said first driving means and rotation of said excitation filter disk driven by said second driving means with each other.

15. A confocal microscope comprising:

a random pinhole disk in which a plurality of pinholes are arbitrarily formed;

wavelength selection means for switching a wavelength or wavelength range of at least one of illumination light and observation light in synchronism with rotation of said random pinhole disk;

means for rotating said random pinhole disk; and means for irradiating illumination light, which has passed through each of said pinholes, toward a specimen.

16. A microscope according to claim 15, wherein said random pinhole disk comprises:

a pinhole portion having a plurality of pinholes; and a plurality of opening portions.

17. A microscope according to claim 15, wherein said random pinhole disk comprises:

a pinhole portion having a plurality of pinholes;

a plurality of opening portions; and a plurality of light-shielding portions.

* * * * *